US007787529B2

(12) United States Patent
Cheng et al.

(10) Patent No.: US 7,787,529 B2
(45) Date of Patent: *Aug. 31, 2010

(54) AUDIO CODEC INTEGRATED WITH BASEBAND PROCESSING AND RF

(75) Inventors: Taiyi Cheng, San Jose, CA (US); Hongwei Kong, Denville, NJ (US); Thirunathan Sutharsan, San Diego, CA (US); Claude Hayek, Huntington Beach, CA (US)

(73) Assignee: Broadcom Corporation, Irvine, CA (US)

(*) Notice: Subject to any disclaimer, the term of this patent is extended or adjusted under 35 U.S.C. 154(b) by 888 days.

This patent is subject to a terminal disclaimer.

(21) Appl. No.: 11/643,485

(22) Filed: Dec. 20, 2006

(65) Prior Publication Data

US 2008/0151975 A1 Jun. 26, 2008

(51) Int. Cl.
*H04L 5/16* (2006.01)

(52) U.S. Cl. ..................... 375/220; 375/316; 455/550.1

(58) Field of Classification Search ................. 375/219, 375/220, 222, 259, 260, 295, 316; 455/73, 455/74.1, 79, 83, 84, 550.1
See application file for complete search history.

(56) References Cited

U.S. PATENT DOCUMENTS

| | | | | |
|---|---|---|---|---|
| 5,923,761 | A * | 7/1999 | Lodenius | 455/73 |
| 6,301,366 | B1 * | 10/2001 | Malcolm et al. | 381/119 |
| 6,920,528 | B1 * | 7/2005 | Chan | 711/115 |
| 7,088,835 | B1 * | 8/2006 | Norris et al. | 381/107 |
| 7,221,926 | B1 * | 5/2007 | Beard | 455/334 |
| 7,586,904 | B2 * | 9/2009 | Shore et al. | 370/352 |
| 2008/0125037 | A1 * | 5/2008 | Ibrahim et al. | 455/41.2 |

* cited by examiner

*Primary Examiner*—Dac V Ha
(74) *Attorney, Agent, or Firm*—Garlick Harrison & Markison

(57) ABSTRACT

An audio codec integrated with baseband processing and RF on a single IC chip. The audio codec may be implemented in a variety of wireless transceivers, such as cell phones, to offer voice, data and/or music functions. The codec also has monaural and stereo channels for audio output, as well as stereo inputs.

19 Claims, 7 Drawing Sheets

AUDIO CODEC INTEGRATED WITH BASEBAND PROCESSING AND RF

BACKGROUND OF THE INVENTION

1. Technical Field of the Invention

The embodiments of the invention relate to wireless communications and more particularly to integrating a variety of functional circuitry on an integrated circuit chip.

2. Description of Related Art

Communication systems are known to support wireless and wire lined communications between wireless and/or wire lined communication devices. Such communication systems range from national and/or international cellular telephone systems to the Internet to point-to-point in-home wireless networks. Generally, each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). The receiver is coupled to an antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillators to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillators to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

Earlier wireless devices were produced with a baseband processing stage on a first integrated circuit chip and a RF stage on a separate integrated circuit chip. To produce physically smaller devices, the two functions were integrated onto the same integrated circuit chip. However, the integration did not extend to certain other functions, such as audio coding and decoding. With the current pursuit of including various higher performing audio functions into wireless devices, there is an advantage to integrating the audio coding/decoding function along with the baseband and RF functions. Accordingly, there is a need to develop an integrated circuit chip that includes an audio coder/decoder with the baseband and RF stages to enhance performance of chips designed for wireless communications.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that implement audio functions in a wireless device and, particularly, in integrating the audio function on the same integrated circuit chip containing baseband processing and RF functions.

Figure 1:
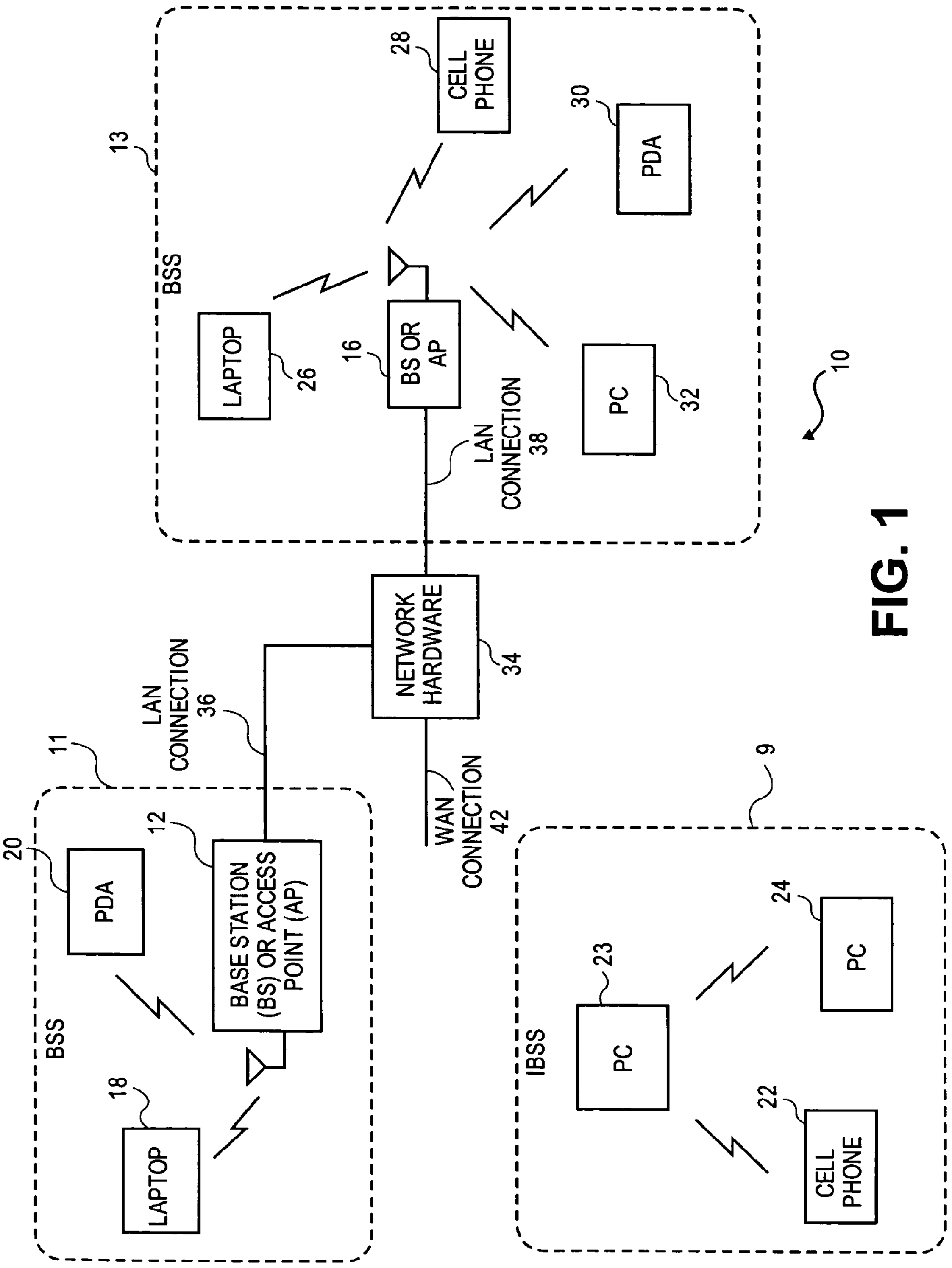
FIG. 1 is a block system diagram illustrating a wireless communication system in accordance with one embodiment of the present invention.

FIG. 1 is a block schematic diagram illustrating a communication system 10 that includes a plurality of base stations and/or access points 12, 16, a plurality of wireless communication devices 18-32 and a network hardware component 34. Network hardware 34, which may be a router, switch, bridge, modem, system controller, et cetera provides a wide area network connection 42 for the communication system 10. Wireless communication devices 18-32 may be laptop host computers 18 and 26, personal digital assistant hosts 20 and 30, personal computer hosts 24 and 32 and/or cellular telephone hosts 22 and 28.

Wireless communication devices 22, 23, and 24 are located within an independent basic service set (IBSS) area and communicate directly (i.e., point to point). In this configuration, these devices 22, 23, and 24 typically only communicate with each other. To communicate with other wireless communication devices within system 10 or to communicate outside of system 10, devices 22, 23, and/or 24 affiliate with one of the base stations (BS) or access points (AP).

Base stations or access points 12, 16 are located within basic service set (BSS) areas 11 and 13, respectively, and are coupled to network hardware 34 via one or more of local area network connections 36, 38. Such a connection provides base station or access point 12, 16 with connectivity to other devices within system 10 and may also provide connectivity to other networks via a WAN connection 42. To communicate with the wireless communication devices within its BSS 11 or 13, each of the base stations or access points 12, 16 has an associated antenna or antenna array. For instance, base station or access point 12 wirelessly communicates with wireless communication devices 18 and 20 while base station or access point 16 wirelessly communicates with wireless communication devices 26, 28, 30, 32. Typically, the wireless communication devices register with a particular base station or access point 12, 16 to operate within communication system 10.

Typically, base stations are used for cellular voice and/or data telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag. As described below, one or more of the devices shown in FIG. 1, may include an embodiment of the invention. One of the devices of FIG. 1 that is more likely to implement an embodiment of the invention described in reference to FIG. 2-6 is a wireless telephone that is commonly referred to as a cell phone, such as cell phone 28 of FIG. 1.

Figure 2:
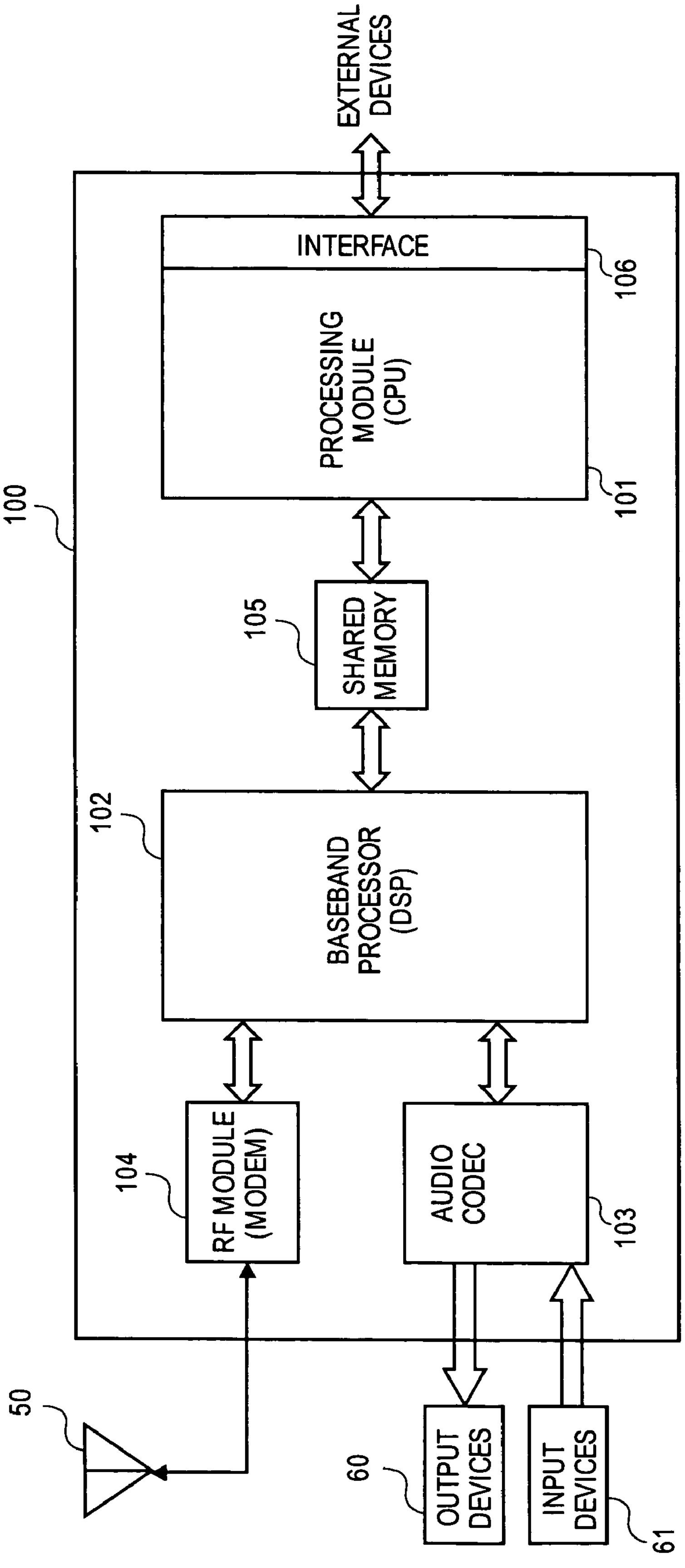
FIG. 2 is a block schematic block diagram illustrating an integrated circuit chip that includes an audio codec, a baseband processor and a RF front-end all on the same chip.

FIG. 2 is a schematic block diagram of an embodiment of a wireless communication device, in which a single integrated circuit (IC) chip includes an audio coder/decoder (hereinafter referred to as a "codec"), a baseband (BB) processing module and a radio or radio frequency (RF) front-end. Accordingly, an IC 100 includes a baseband processing module 102 (also referred to as simply "baseband processor"), audio codec 103 and RF module (also referred to as a "modem") 104 as part of the IC. In the particular embodiment shown, BB processor is a digital signal processor (DSP), however, the BB processor need not be limited to a DSP. Also shown as part of IC 100 is a processing module 101, which in this embodiment is referred to as a central processing unit (CPU). CPU 101 may include interface 106 that couples to various external devices, such as peripherals. A shared memory 105 may be present in some embodiments to store data and/or instructions. Shared memory 105 then would allow sharing of data and/or facilitate data transfer between DSP 102 and CPU 101. It is to be noted that although a shared memory is illustrated in the particular embodiment shown, in other embodiments separate memory may be used by DSP 102. The memory may be included within DSP 102 in some embodiments or even resident off chip in other embodiments.

In some embodiments, CPU 101 may not be resident on IC 100. For example, if a host processor is used, then the external host processor is coupled to IC 100 to perform the functions of CPU 101. Thus, CPU 101 is shown as part of IC 100 in FIG. 2, but in some embodiments, CPU 101 may not be present. In other embodiments, equivalent CPU functions may be performed by an external processor, such as a host processor. A host device (when used) may include laptop computer circuitry, personal computer circuitry, PDA circuitry, cellular processing circuitry, personal entertainment circuitry, and/or a processing module. Shared memory 105 or (separate memory when used) may be a read-only memory, random access memory, volatile memory, non-volatile memory, static memory, dynamic memory, flash memory, cache memory, and/or any device that stores digital information.

DSP 102 may be implemented in a variety of ways and in some embodiments, a known DSP design may be adapted for DSP 102. Generally, DSPs process digital information for a particular function and, in this instance, DSP 102 operates as a BB processor. Thus, DSP 102 processes digital information from CPU 101 and/or codec 103 into a particular format for transfer to modem 104 for transmission or, alternatively, receives incoming information from CPU 101 and/or modem 104 for processing based on a particular usage or protocol of the signal. In one embodiment, DSP 102 may actually include one or more processing modules. For example, a first baseband processing module and a second baseband processing module may reside within DSP 102. The first baseband processing module may operate on data that corresponds to a wireless communication standard known as EDGE, while the second baseband processing module may operate on data that corresponds to a wireless communication standard known as GSM. EDGE and GSM are examples only, and DSP 102 may operate on other standards as well. As noted above, DSP 102 may utilize a separate memory instead of the shared memory.

Modem 104 performs as a RF front end to receive digital data from DSP 102 and convert the data for transmission as an outgoing RF signal from antenna 50. Modem 104 typically also receives incoming RF signal from antenna 50 and converts the RF signal to digital format for processing by DSP 102. A variety of modulation and demodulation techniques for modems (acronym for modulator/demodulator), including known techniques, may be implemented within modem 104. Furthermore, although antenna 50 is shown directly coupled to modem 104, one or more intermediate stages may be present. For example, there may be a power amplifier (PA) module, or a driver and a PA, disposed between modem 104 of IC 100 and antenna 50. In some instances, antenna 50 may also be included within IC 100.

Codec 103 is coupled to DSP 102 to perform audio coding and decoding. Codec 103 may be coupled to one or more external output device(s) 60, in which codec 103 converts digital signals from DSP 103 into analog audio signals for output by device(s) 60. Alternatively, codec 103 may be coupled to one or more external input device(s) 61, in which codec 103 converts analog audio input signals to digital signals for processing by DSP 103. Typically, output device(s) 60 and input device(s) 61 are audio devices that operate at audio frequencies, however, they need not necessarily be audio devices.

As illustrated in FIG. 2, DSP 102, audio codec 103 and RF module 104 are all integrated within IC 100. The integration of these units onto a same semiconductor chip allows for added functionality in a more compact device. Instead of utilizing separate ICs in a wireless device to perform these functions, IC 100 allows the above-noted functions to be available within a single IC. For wireless devices, such as cell phones, RF processing, BB processing and audio processing may be obtained in a single IC, which allows for ease of design, increased design options, and possible reduction in physical size.

The integration of DSP 102 (or other BB processing device), codec 103 and modem 104 in the same IC chip allows for various audio functions to be performed on chip. Some examples of different operating modes for IC 100 are illustrated in FIGS. 3-6. These modes of operation are just some of the available applications of IC 100. It is to be noted that other modes of operation may be available in other embodiments. For FIGS. 3-6, IC 100 is utilized in a cell phone and the example modes of operation shown are for a cell phone. Again, IC 100 may be implemented in other devices and is not limited for use only in cell phones.

Figure 3:
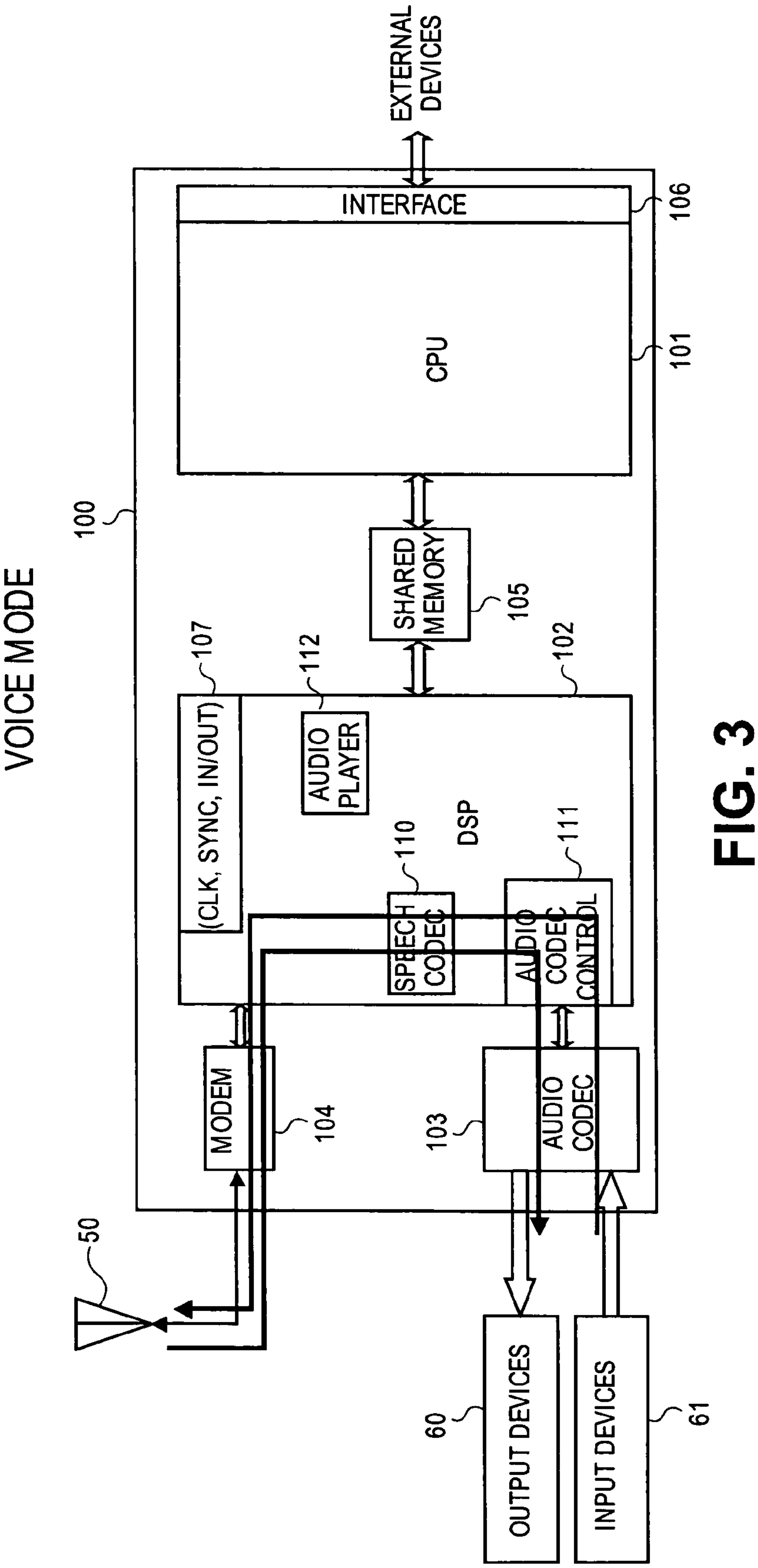
FIG. 3 is a block schematic diagram illustrating one embodiment for performing in a voice mode for the integrated circuit chip of FIG. 2.

FIG. 3 shows IC 100 in a voice mode of operation. The voice mode in a cell phone is the standard telephonic voice conversation mode associated with telephones. Input device 61 is typically a microphone and output device 60 is a speaker, headphone, ear phone or some other listening device. In voice mode, audio (speech or tone) signals from input device 61 are coupled to codec 103 for conversion to digital signals, which are processed by DSP 102. DSP 102 includes an audio codec control unit 111 to coordinate the transfer of signals with codec 103. In voice mode, DSP 102 includes a speech codec 110 to process the digital speech based on a particular standard or protocol. Digital speech is then coupled to modem 104 for modulation and to be transmitted from antenna 50. Alternatively, incoming voice follows a reverse path and function, in which the received signal at antenna 50 is demodulated in modem 104, processed by speech codec 110 in DSP 102 and is converted to audio in codec 103. Furthermore, as illustrated for IC 100, DSP 102 includes internal circuits 107 that provide clocking, synchronizing and input/output interface functions. An audio player 112 is also included within DSP 102 to process music signals for playing music.

Figure 4:
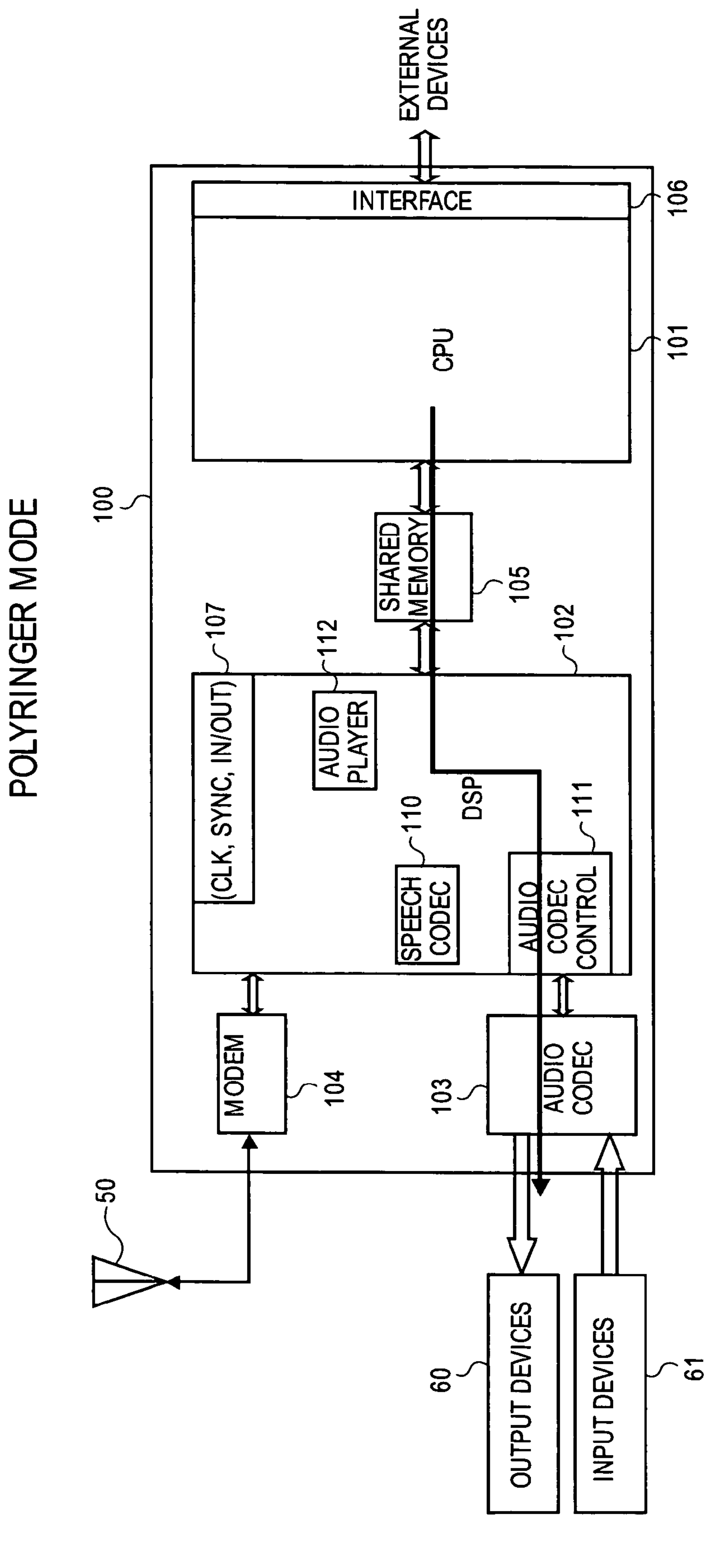
FIG. 4 is a block schematic diagram illustrating one embodiment for performing in a polyringer mode for the integrated circuit chip of FIG. 2.

FIG. 4 illustrates a polyringer mode of operation. Multiple ring tone combinations (polyringer) are typically available in current cell phones and programming allows certain ringers to be used for certain type of calls or functions. Accordingly, in a polyringer mode of operation, the internal CPU determines when a particular ring is to be activated (for example, when there is an incoming call of a certain type or from a certain individual) and selects a ring, which is stored in the shared memory. The selected ring is then processed by DSP 102 and coupled to codec 103 for output to output device 60.

Figure 5:
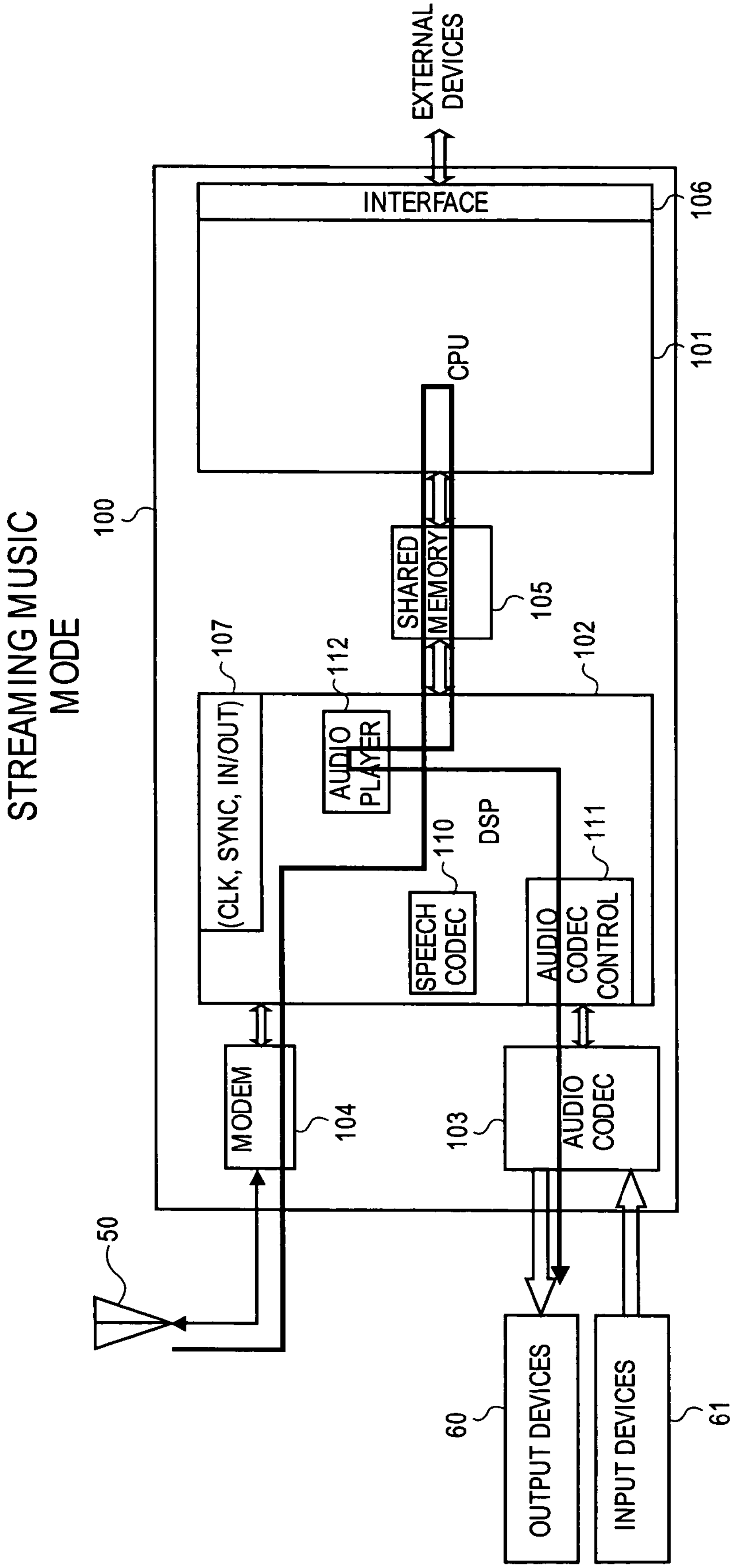
FIG. 5 is a block schematic diagram illustrating one embodiment for performing in a streaming music mode for the integrated circuit chip of FIG. 2.

FIG. 5 illustrates a streaming mode of operation, in which streaming music is received at antenna 50. After RF demodulation, the streaming music signal is sent to CPU 101. The actual downloaded music signal may be stored in shared memory 105 or some other memory. The CPU controls the downloading and playing of the downloaded music. When music is to be played, audio player 112 of DSP 102 processes the music that is then sent to codec 103 for output to output device 60.

Figure 6:
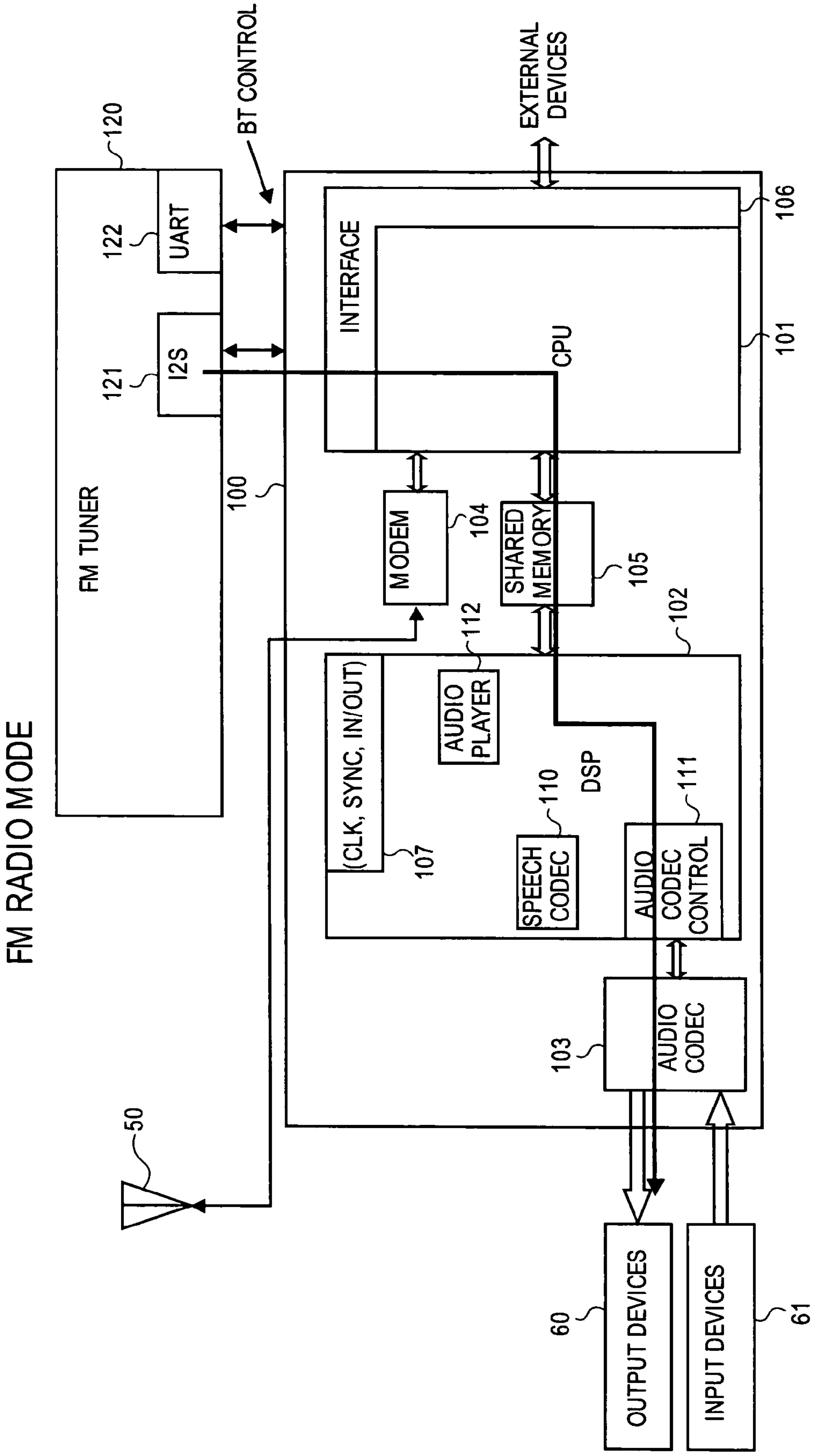
FIG. 6 is a block schematic diagram illustrating one embodiment for performing in a FM radio mode for the integrated circuit chip of FIG. 2.

FIG. 6 illustrates a FM (frequency modulation) radio mode of operation. In this instance, an external FM tuner 120 is coupled to CPU 101 through interface 106. Thus, FM tuner 120 operates as one of the external devices that may be coupled to interface 106. FM tuner 120 tunes to various FM radio broadcasting stations and may be tuned to one or more of the stations. The incoming signal may be received through antenna 50 or a separate antenna available to tuner 120. In one embodiment, the FM broadcast may be received through antenna 50 and demodulated by modem 104. In another embodiment, FM tuner 120 may have its own reception and/or RF conversion components. The received FM radio signal in digital form is then coupled to CPU 101 through interface 106. In one embodiment, tuner 120 couples the tuned digital signal to IC 100 through a I2S (Inter-IC sound) interface 121, which is a serial bus design for digital audio, and BlueTooth (BT) control signals are coupled through a universal asynchronous receiver/transmitter (UART) interface 122. Other interface types may be employed in other embodiments. The digital FM signal is then coupled via codec control unit 111 to audio codec 103 for output to output device 60. Note that with FM signals, the digital signal processing is performed in FM tuner 120 and not in DSP 102. Furthermore, although FM radio tuner is noted in the example of FIG. 6, AM (amplitude modulation) radio tuners, satellite radio tuners, as well as others, may be readily implemented.

Figure 7:
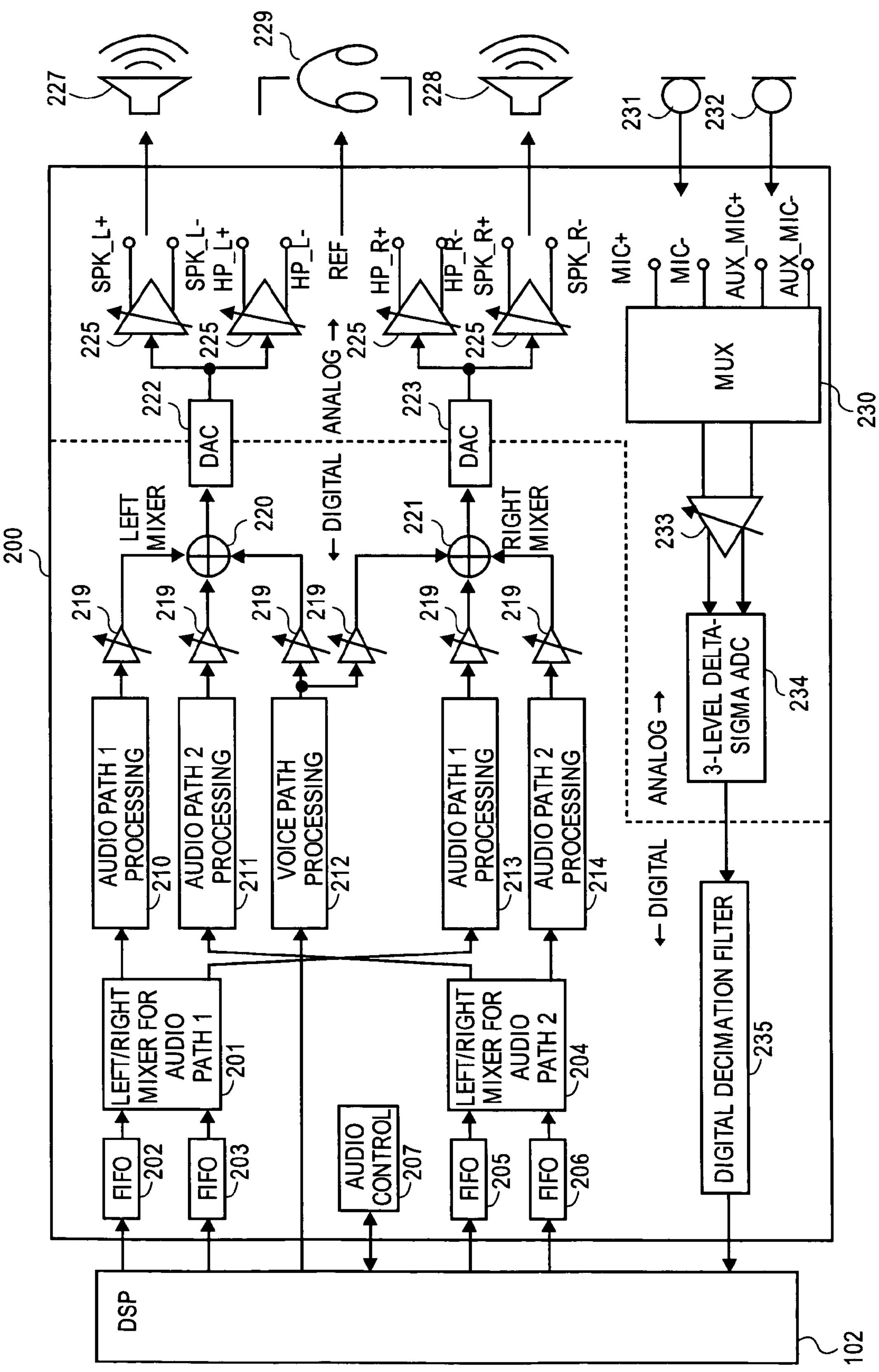
FIG. 7 is a block schematic diagram illustrating one embodiment that is implemented for the audio codec of FIGS. 2-6.

Although a variety of audio codec designs may be implemented for codec 103, one example embodiment is shown in FIG. 7. Audio codec 200 of FIG. 7 may be implemented as codec 103. Codec 200 is coupled to DSP 102 for transfer of digital signals between codec 200 and DSP 102. Control signals for operating codec 200 with DSP 102 are coupled between audio control unit 207 of codec 200 and audio codec control unit 111 of DSP 102. Speech (voice) input is monaural (or monotone), so a single input is coupled to voice path processing unit 212. Music, however, is stereo and has left (L) and right (R) channels of input from DSP 102. Furthermore, instead of having just one path for music audio, codec 200 has two separate paths. The first audio path is to a mixer 201 through respective L and R first-in/first-out (FIFO) buffers 202, 203. Path 1 mixer 201 may perform a mixing operation in some application or it may not in others. L output from mixer 201 is sent to L audio path 1 processing unit 210 and then to L mixer 220. Similarly, R output from mixer 201 is sent to R audio path 1 processing unit 213 and then to R mixer 221.

An equivalent audio path 2 is present comprising of FIFO units 205, 206, mixer 204 and respective L and R audio path 2 processing units 211, 214. L output from audio path 2 processing unit 211 is coupled to mixer 220 and R output from audio path 2 processing unit 214 is coupled to mixer 221. The output from voice path processing unit 212 is also coupled to both mixers 220, 221. Also shown are digital gain amplifiers 219 to adjust the gain of the outputs from units 210-214.

Mixers 220, 221 perform mixing operation on signals present, if any mixing is needed. The output of mixers 220, 221 are coupled to respective digital-to-analog (DAC) converters 222, 223 for conversion to analog audio frequencies. Respective outputs are coupled to volume control devices 225 for output to L speaker 227 and R speaker 228, or alternatively to headphone 229 (or some other head mounted hearing device). Note that the dotted line in FIG. 7 outlines the separation of digital side of codec 200 from the analog side.

The input is obtained through a microphone (MIC) input 231 or an auxiliary input (AUX_MIC) 232, which both are stereo. A multiplexer 230 selects between the two inputs and the input signal is gain adjusted by amplifier 233. Subsequently, an analog-to-digital conversion of the analog input signal is obtained by use of an analog-to-digital converter (ADC), In the particular embodiment, a 3-level delta sigma ($\Delta\Sigma$) ADC is employed and its output filtered by a digital decimation filter 235. The output of filter 235 is then coupled to DSP 235.

Accordingly, audio codec 200 provides for five channels of audio output in way of one channel of monaural audio (such as voice audio) and two separate L+R stereo channels (such as for stereo music). The second set of L+R channels allows for various music options to be used with the output form codec 200. It is to be noted that codec 200 is but one embodiment for implementing codec 103. Although voice and music are noted in codec 103 and 200, it is to be noted that data may be transferred through the codec as well.

Thus, an audio codec integrated with baseband processing and RF on a single IC chip is described. The audio codec may be implemented in a variety of wireless transceivers, such as cell phones, to offer voice, data and/or music functions.

As, may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more of its corresponding functions and may further include inferred coupling to one or more other items.

Furthermore, the term "module" is used herein to describe a functional block and may represent hardware, software, firmware, etc., without limitation to its structure. A "module" may be a circuit, integrated circuit chip or chips, assembly or other component configurations. Accordingly, a "processing module" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory. A "module" may also be software or software operating in conjunction with hardware.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. Similarly, flow diagram blocks and methods of practicing the embodiments of the invention may also have been arbitrarily defined herein to illustrate certain significant functionality. To the extent used, the flow diagram block boundaries and methods could have been defined otherwise and still perform the certain significant functionality. Such alternate definitions of functional building blocks, flow diagram blocks and methods are thus within the scope and spirit of the claimed embodiments of the invention. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. An apparatus comprising:

a radio frequency (RF) front end;

a baseband processor coupled to the RF front end to receive demodulated incoming signals from the RF front end for digital processing and to transmit outgoing digital signals to the RF front end for RF transmission, the baseband processor utilizing a digital signal processor (DSP) that includes a speech coder/decoder (codec) to process digital speech based on a particular standard or protocol and the DSP further includes an audio player to process music; and an audio codec coupled to the baseband processor to convert digitally processed signals from the DSP for output as audio output signals, including digital speech processed by the speech decoder of the DSP and music processed by the audio player of the DSP, in which the codec is integrated on a single integrated circuit chip with the RF front end and the baseband processor.

2. The apparatus of claim 1, wherein the audio codec receives audio input signals and converts the audio input signals to digital format for processing by the DSP.

3. The apparatus of claim 2, wherein the audio codec has both monaural output and stereo output.

4. The apparatus of claim 3, wherein the audio codec has stereo inputs.

5. The apparatus of claim 3, wherein the audio codec has multiple stereo inputs.

6. The apparatus of claim 3, wherein the audio codec has two stereo signal paths and a right and left mixer to mix two sets of stereo signals in the two stereo signal paths.

7. The apparatus of claim 6, wherein the right and left mixers also mix a voice signal with the one or both of the two sets of stereo signals.

8. The apparatus of claim 2, wherein the audio codec has both voice output and stereo output.

9. The apparatus of claim 2, wherein the audio codec has both voice output and two sets of stereo outputs.

10. An apparatus comprising:

a radio frequency (RF) module to receive incoming RF signals and transmit outgoing RF signals;

a baseband processing module coupled to the RF module to receive demodulated incoming signals from the RF module for digital processing and to transmit outgoing digital signals to the RF module for RF modulation and transmission, the baseband processing module utilizing a digital signal processor (DSP) that includes a speech coder/decoder (codec) to process digital speech based on a particular standard or protocol and the DSP further includes an audio player to process music; and an audio codec coupled to the baseband processing module to convert digitally processed signals from the DSP for output as audio output signals, including digital speech processed by the speech decoder of the DSP and music processed by the audio player of the DSP, and to convert audio input signals to digital format for processing by the DSP for transmission, in which the codec is integrated on a single integrated circuit chip with the RF module and the baseband processing module.

11. The apparatus of claim 10, wherein the audio codec has both monaural output and stereo output.

12. The apparatus of claim 10, wherein the audio codec has both voice output and stereo music output.

13. The apparatus of claim 12, wherein the audio codec uses voice output and audio input for respective telephonic reception and transmission.

14. The apparatus of claim 13, wherein the audio codec uses stereo music output for streaming music received by the RF module.

15. The apparatus of claim 14, further including a central processing module coupled to the baseband processing module to control operation of the baseband processing module and to provide an external interface for the integrated circuit chip, the central processing module also integrated on the integrated circuit chip.

16. The apparatus of claim 15, wherein the integrated circuit is used for operating a wireless device.

17. The apparatus of claim 15, wherein the integrated circuit is used for operating a cell phone.

18. The apparatus of claim 12, wherein the audio codec uses stereo music output for output of broadcasted radio.

19. The apparatus of claim 12, wherein the audio codec uses stereo music output for output of broadcasted FM radio.

* * * * *